(12) United States Patent
DeYoung et al.

(10) Patent No.: US 7,407,703 B2
(45) Date of Patent: Aug. 5, 2008

(54) COMPOSITE MEMBRANE HAVING OLEOPHOBIC PROPERTIES

(75) Inventors: James DeYoung, Durham, NC (US); Robert J. Klare, St. Joseph, MO (US)

(73) Assignees: BHA Group, Inc., Kansas City, MO (US); Micell Technologies, Inc., Raleigh, NC (US)

(*) Notice: Subject to any disclaimer, the term of this patent is extended or adjusted under 35 U.S.C. 154(b) by 79 days.

(21) Appl. No.: 11/204,232

(22) Filed: Aug. 15, 2005

(65) Prior Publication Data
US 2006/0014010 A1   Jan. 19, 2006

Related U.S. Application Data

(63) Continuation-in-part of application No. 10/255,043, filed on Sep. 20, 2002.

(51) Int. Cl.
  *B32B 27/08* (2006.01)
  *D06M 15/277* (2006.01)
(52) U.S. Cl. ............... 428/319.3; 428/319.7; 428/319.9; 428/315.5; 428/315.7; 428/543; 428/306.6; 428/308.4; 524/544; 524/555; 524/556; 524/560
(58) Field of Classification Search ............... 428/319.3, 428/306.6, 308.4, 315.5, 315.7, 543, 319.7; 524/544, 556, 555, 560
See application file for complete search history.

(56) References Cited

U.S. PATENT DOCUMENTS

| | | | |
|---|---|---|---|
| 4,194,041 A | 3/1980 | Gore et al. | |
| 4,755,192 A | 7/1988 | Koros et al. | |
| 4,954,388 A | 9/1990 | Mallouk et al. | |
| 4,970,093 A | 11/1990 | Sievers et al. | |
| 4,992,308 A | 2/1991 | Sunol | |
| 5,082,472 A | 1/1992 | Mallouk et al. | |
| 5,116,650 A | 5/1992 | Bowser | |
| 5,130,024 A | 7/1992 | Fujimoto et al. | |
| 5,156,780 A | 10/1992 | Kenigsberg et al. | |
| 5,286,279 A | 2/1994 | Wu | |
| 5,342,434 A | 8/1994 | Wu | |
| 5,376,441 A | 12/1994 | Wu et al. | |

(Continued)

FOREIGN PATENT DOCUMENTS

WO   WO 94/22928   10/1994

OTHER PUBLICATIONS

Translation of JP 10-182262, Yamaura et al, "Ceramic Sintered Body Having Continuous Through Pore and its Production", Jul. 7, 1998.*

(Continued)

*Primary Examiner*—Hai Vo
(74) *Attorney, Agent, or Firm*—Armstrong Teasdale LLP

(57) ABSTRACT

An air permeable composite article that in one embodiment includes a porous base membrane that includes a plurality of nodes and fibrils defining a plurality of interconnecting pores extending through the porous base membrane with each node and fibril having a surface. The composite article also includes a precipitated coating material deposited on the surfaces of the plurality of nodes and fibrils. The coating material includes a copolymer formed from a fluorinated acrylate or methacrylate, an n-alkyl acrylate or methacrylate, and an isocyanate crosslinker. The precipitated coating material provides oil and contaminating agent resistance of at least a number six measured in accordance with AATCC 118 test method.

18 Claims, 4 Drawing Sheets

U.S. PATENT DOCUMENTS

| | | |
|---|---|---|
| 5,385,694 A | 1/1995 | Wu et al. |
| 5,460,872 A | 10/1995 | Wu et al. |
| 5,539,047 A | 7/1996 | Wu et al. |
| 5,539,072 A | 7/1996 | Wu |
| 5,670,102 A | 9/1997 | Perman et al. |
| 5,683,473 A | 11/1997 | Jureller et al. |
| 5,863,612 A | 1/1999 | DeSimone |
| 5,885,494 A | 3/1999 | Venkataraman et al. |
| 5,912,278 A | 6/1999 | Venkataraman |
| 5,976,380 A | 11/1999 | Moya |
| 6,048,369 A | 4/2000 | Smith et al. |
| 6,162,369 A * | 12/2000 | Allewaert et al. .......... 252/8.62 |
| 6,228,477 B1 | 5/2001 | Klare et al. |
| 6,410,084 B1 | 6/2002 | Klare et al. |
| 6,736,996 B1 | 5/2004 | Carbonell et al. |
| 7,078,456 B2 * | 7/2006 | Jariwala et al. ............. 524/544 |
| 2002/0108183 A1 | 8/2002 | Smith et al. |
| 2004/0059717 A1* | 3/2004 | Klare et al. .................... 707/2 |

OTHER PUBLICATIONS

Search Report, Oct. 23, 2006, Application No./Patent No. 06254267.5-2113; Date of Completion Oct. 10, 2006.

\* cited by examiner

COMPOSITE MEMBRANE HAVING OLEOPHOBIC PROPERTIES

CROSS REFERENCE TO RELATED APPLICATIONS

This application is a continuation-in-part of U.S. patent application Ser. No. 10/255,043 filed Sep. 20, 2002, which is hereby incorporated by reference in its entirety.

BACKGROUND OF THE INVENTION

This invention relates generally to composite porous membranes, and more particularly to composite porous membranes having oleophobic properties.

It is known that a porous membrane may have at least one property that is limited by the material that the membrane is made from. For example, a porous membrane made from an expanded polytetrafluoroethylene (ePTFE) material that is intended for use in garments and apparel has excellent hydrophobicity so it is considered to be waterproof at a relatively low challenge pressure. However, the ePTFE membrane tends to absorb oil. Such a tendency to absorb oil could affect the hydrophobicity in the area of the membrane that has absorbed the oil so that area of the membrane may no longer be considered waterproof.

U.S. Pat. No. 4,194,041 discloses a way to protect an ePTFE membrane from contamination by oil. A continuous hydrophilic film is attached to the ePTFE membrane to protect one side of the ePTFE membrane from oil. This structure is not air permeable and the hydrophilic film must contain moisture to transmit the moisture through the membrane. A heavier garment results from the necessary moisture present in the hydrophilic film. A person wearing a garment incorporating the membrane with the hydrophilic film often can feel uncomfortable because the hydrophilic film that contains moisture contacts the wearer's body, especially in cool environments. Such discomfort has been described as a "wet and clammy" feeling. This discomfort may be further aggravated by a lack of air moving through the garment that could serve to carry the moisture away from inside the garment.

U.S. Pat. No. 5,539,072 discloses the use of relatively small fluorinated acrylate particles to form a protective coating on a membrane. U.S. Pat. No. 5,976,380 discloses using a solution to provide a hydrophilic coating on a porous membrane. U.S. Pat. No. 5,156,780 discloses the in-situ polymerization of a protective coating layer on membrane.

U.S. Pat. Nos. 6,228,447 and 6,410,084 disclose an improved membrane structure that is air permeable to overcome the discomfort drawback described above yet protect the ePTFE membrane from oil contamination. A fluorinated acrylate oleophobic treatment is applied from relatively large particles in an aqueous dispersion in a manner so pores in the ePTFE membrane are not completely blocked. Air flow is permitted through the ePTFE membrane while it is protected from oil contamination. The effectiveness of the treatment is dependent on the particle size of the treatment material relative to the effective pore size in the ePTFE membrane.

BRIEF DESCRIPTION OF THE INVENTION

In one aspect, an air permeable composite article is provided. The composite article includes a porous base membrane that includes a plurality of nodes and fibrils defining a plurality of interconnecting pores extending through the porous base membrane with each node and fibril having a surface. The composite article also includes a precipitated coating material deposited on the surfaces of the plurality of nodes and fibrils. The coating material includes a copolymer formed from a fluorinated acrylate or methacrylate, an n-alkyl acrylate or methacrylate, and an isocyanate crosslinker. The precipitated coating material provides oil and contaminating agent resistance of at least a number six measured in accordance with AATCC 118 test method.

In another aspect, an air permeable composite article is provided that includes a porous base membrane having a plurality of nodes and fibrils defining a plurality of interconnecting pores extending therethrough, with each node and fibril having a surface. The composite article also includes a coating material deposited on the surfaces of the plurality of nodes and fibrils. The coating material includes a copolymer formed from a fluorinated acrylate, butyl acrylate, and an isocyanate crosslinker having the following structure:

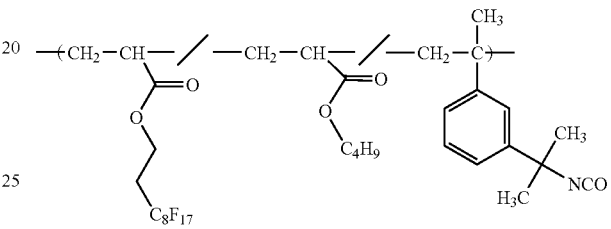

In another aspect, an air permeable sheet material is provided that includes a porous base membrane having a plurality of nodes and fibrils defining a plurality of interconnecting pores extending through the base membrane, with each node and fibril having a surface. The sheet material also includes a precipitated coating material deposited on substantially all the surfaces of the plurality of nodes and fibrils. The coating material includes a copolymer formed from a fluorinated acrylate or methacrylate, an n-alkyl acrylate or methacrylate, and an isocyanate crosslinker. The precipitated coating material is applied from a low surface tension fluid capable of entering the pores in the porous base membrane. The coating material is precipitated on the surfaces of the plurality of nodes and fibrils upon rendering the coating material insoluble in the low surface tension fluid. The precipitated coating material provides oil and contaminating agent resistance of at least a number six measured in accordance with AATCC 118 test method.

DETAILED DESCRIPTION OF THE INVENTION

A composite membrane having oleophobic properties and a method of making the composite membrane are described below in detail. The composite membrane includes, in an exemplary embodiment, a porous base membrane having a plurality of pores and a coating applied to the base membrane using a densified gas, for example, a supercritical or near critical fluid, as a solvent. The coating has oleophobic properties and is deposited onto the base membrane without blocking the pores of the membrane by changing the conditions of the densifed gas, for example, temperature and/or pressure.

Figure 1:
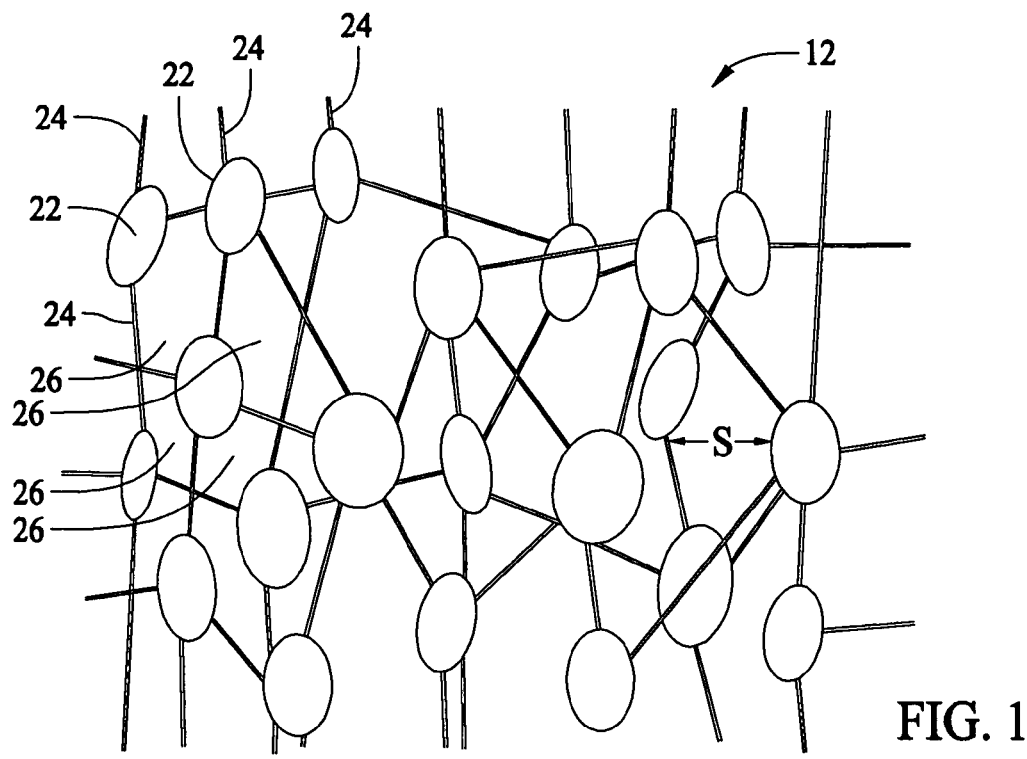
FIG. 1 is an enlarged schematic illustration of a portion of a membrane treated according to an embodiment of the present invention.

There are numerous uses for a porous membrane that has oleophobic properties. FIG. 1 is a schematic illustration of an exemplary embodiment of a composite membrane 12 that can be used in garments or apparel. Composite membrane 12 is wind resistant, waterproof, moisture vapor transmissive and air permeable. Composite membrane 12 is oleophobic and offers protection from contaminating agents, such as oil-containing body fluids in the form of perspiration. "Moisture vapor transmissive" is used to describe the passage of water vapor through a structure, such as composite membrane 12. The term "waterproof" is used to describe that composite membrane 12 does not "wet" or "wet out" by a challenge liquid, such as water, and prevents the penetration of a challenge liquid through composite membrane 12. The term "wind resistant" is used to describe the ability of composite membrane 12 to prevent air penetration above more than about three cubic feet per minute (CFM) per square foot at a differential pressure drop 0.5 inches of water but has some air permeability to provide enhanced comfort to someone wearing the laminated fabric. "Air permeable" is used to describe the ability of composite membrane 12 to permit a relatively small amount, for example, less than about three CFM per square foot, of air to pass through it. The term "oleophobic" is used to describe a material that is resistant to contamination from absorbing oils, greases, soap, detergent or body fluids, such as perspiration.

Composite membrane 12 includes an untreated or unmodified base membrane 16 that is porous, and preferably microporous, with a three-dimensional matrix or lattice type structure of a plurality of nodes 22 interconnected by a plurality of fibrils 24. Base membrane 16 is made from any suitable material, for example, expanded polytetrafluoroethylene (ePTFE) or a PTFE fabric. In one embodiment, the ePTFE has been at least partially sintered. Generally, the size of a fibril 24 that has been at least partially sintered is in the range of about 0.05 micron to about 0.5 micron in diameter taken in a direction normal to the longitudinal extent of fibril 24.

Surfaces of nodes 22 and fibrils 24 define numerous interconnecting pores 26 that extend completely through base membrane 16 between opposite major side surfaces of base membrane 16 in a tortuous path. In one embodiment, the average size S of pores 26 in base membrane 16 is sufficient to be deemed microporous, but any pore size can be used. In one exemplary embodiment, a suitable average size S for pores 26 in base membrane 16 is about 0.01 microns to about 10 microns, and in another embodiment about 0.1 microns to about 5.0 microns. It is known that ePTFE, while having excellent hydrophobic properties, is not oleophilic. That is, the ePTFE making up base membrane 16 is susceptible to contamination by absorbing oil. Once this occurs the contaminated regions of base membrane 16 are considered as "fouled" because the pores 26 can be easily wet by a challenge liquid, such as water, and the membrane is no longer considered waterproof.

Liquid penetration resistance of the fouled base membrane 16 may be lost if a challenge fluid or liquid can "wet" the membrane. The base membrane 16 is normally hydrophobic but loses its liquid penetration resistance when the challenge liquid initially contacts and wets a major side of the membrane and subsequently contacts and wets the surfaces defining pores 26 in base membrane 16. Progressive wetting of the surfaces defining interconnecting pores 26 occurs until the opposite major side of bases membrane 16 is reached by the wetting or challenge liquid. If the challenge liquid cannot wet the base membrane 16, liquid penetration resistance is retained.

Base membrane 16, in one exemplary embodiment, is made by extruding a mixture of polytetrafluoroethylene (PTFE) fine powder particles (available from DuPont under the name TEFLON® fine powder resin) and lubricant. The extrudate is then calendared. The calendared extrudate is then "expanded" or stretched in at least one and preferably two directions to form fibrils 24 connecting nodes 22 in a three-dimensional matrix or lattice type of structure. "Expanded" is intended to mean sufficiently stretched beyond the elastic limit of the material to introduce permanent set or elongation to fibrils 24. Base membrane 16, in one exemplary embodiment, is heated or "sintered" to reduce and minimize residual stress in the ePTFE material. However, in alternate embodiments, base membrane 16 is unsintered or partially sintered as is appropriate for the contemplated use of base membrane 16.

Other materials and methods can be used to form a suitable base membrane 16 that has an open pore structure. For example, other suitable materials include, but are not limited to, polyolefin, polyamide, polyester, polysulfone, polyether, acrylic and methacrylic polymers, polystyrene, polyurethane, polypropylene, polyethylene, cellulosic polymer and combinations thereof. Other suitable methods of making a porous membrane include foaming, skiving or casting any of the suitable materials.

Base membrane 16 contains many small interconnected pores 26 that fluidly communicate with environments adjacent to the opposite major sides of the membrane. Therefore, the propensity of the ePTFE material of base membrane 16 to adsorb a challenge liquid, as well as whether or not a challenge liquid would be adsorbed into pores 26, is a function of the surface energy of the material, the surface tension of the challenge liquid, the relative contact angle between the challenge liquid and the material and the size or effective flow area of pores 26.

One way to prevent entry of the challenge liquid into pores 26 is to make pores 26 extremely small. However, this may be undesirable or impractical. Another way to prevent or minimize the loss of resistance to liquid penetration of base membrane 16 is to have the surface energy of surfaces of base membrane be lower than the surface tension of the challenge liquid and the relative contact angle more than 90°. Surface energy and surface tension values are typically given in units of dynes/cm. Examples of surface energies, relative surface tensions and some measured relative contact angles are listed in the table below.

| Material | Surface Energy (dynes/cm) | Surface Tension (dynes · cm) | Contact Angle |
|---|---|---|---|
| PTFE | 18-19 | | |
| deionized water | | 72 | 110°-112° |
| tap water | | varies with source | 114°-118° |
| blood | | 60 | 88° |
| perspiration | | 42 | |
| laundry detergent mix | | 30.9 | 112° |

-continued

| Material | Surface Energy (dynes/cm) | Surface Tension (dynes · cm) | Contact Angle |
|---|---|---|---|
| methyl isobutyl ketone | | 23.6 | 42° |
| acetone | | 23.5 | 37° |

| Material | Surface Energy (dynes/cm) | Surface Tension (dynes · cm) | Contact Angle |
|---|---|---|---|
| isopropyl alcohol (100%) | | 20.9 | 62° |
| hexane | | 17.9 | 52° |
| DEET | | 14.8 | |
| liquid $CO_2$ (20° C., 58 bar) | | 1.5 | |
| supercritical $CO_2$ | | ≈0.0 | |

Figure 2:
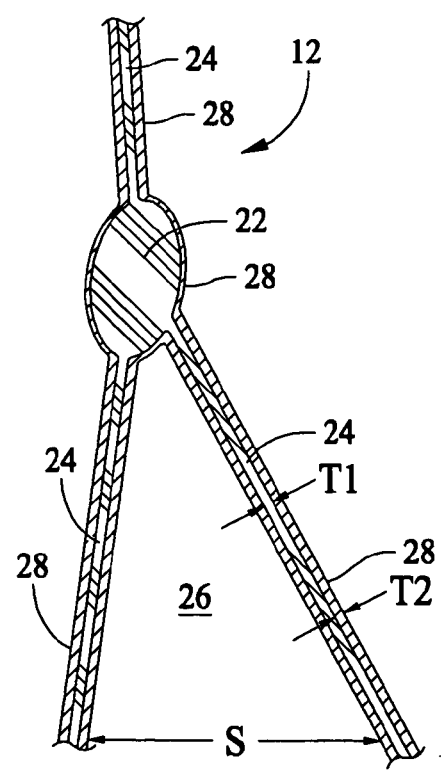
FIG. 2 is an enlarged sectional view of a portion of the membrane in FIG. 1 illustrating a coating on the membrane.
Figure 3:
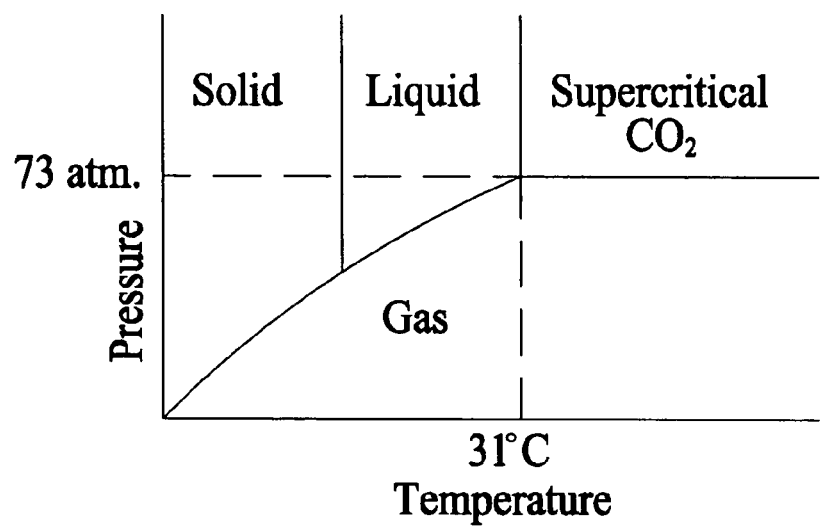
FIG. 3 is a graphical representation of various states of a fluid used in the treatment of the membrane shown in FIG. 1.
Figure 4:
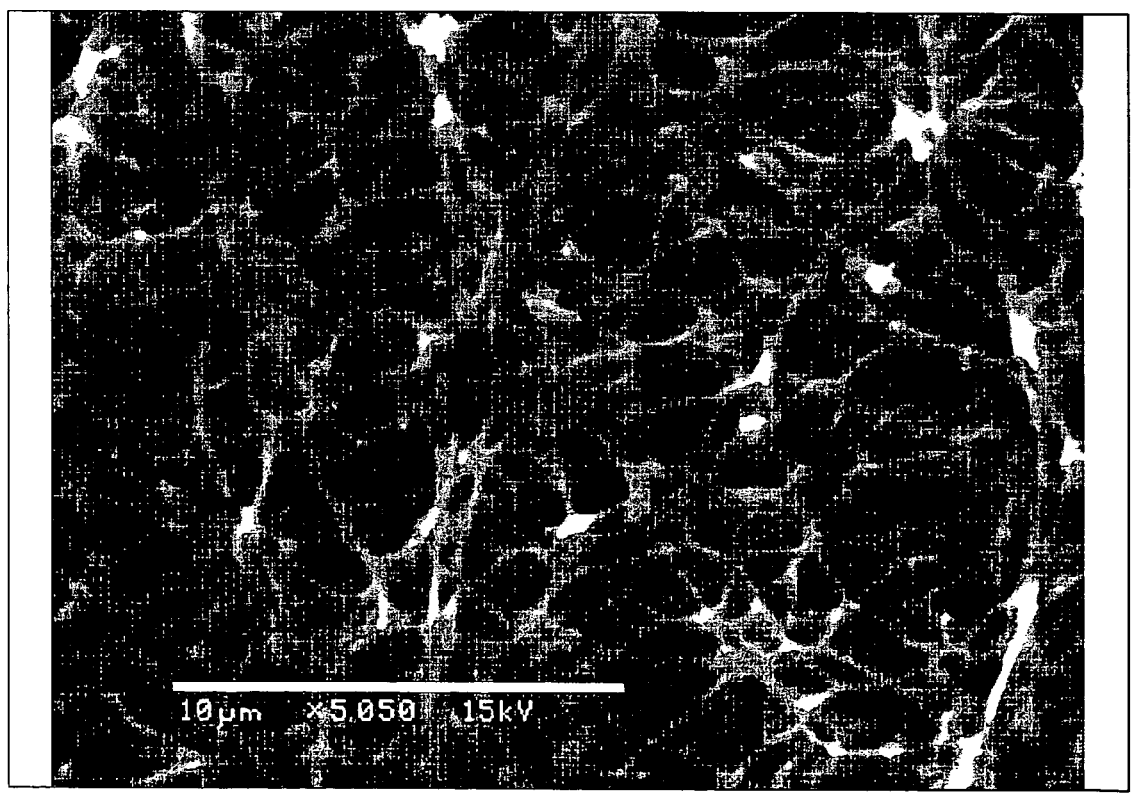
FIG. 4 is an SEM photomicrograph of a portion of the membrane shown in FIG. 1.

As illustrated in FIG. 2, composite membrane 12 includes a treatment or coating 28 on surfaces of base membrane 16, such as a fluorinated polymer material that enhances the oleophobic properties without compromising the air permeability of base membrane 16. Particularly, oleophobic coating 28 is a random copolymer composed of a fluorinated acrylate or methacylate, butyl acrylate or a comparable n-alkyl acrylate or methacrylate, and an isocyanate crosslinker, for example, the copolymer having the following structure:

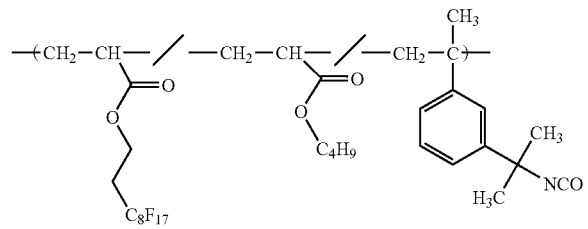

Coating 28 adheres and conforms to the surfaces of nodes 22 and fibrils 24 that define pores 26 in base membrane 16. Coating 28, thus, improves or modifies the oleophobicity of the material of membrane 16 to resist contamination from absorbing of contaminating materials such as oils, body oils in perspiration, fatty substances, soap, detergent-like surfactants and other contaminating agents. Also, composite membrane 12 remains durably liquid penetration resistant when subjected to rubbing, touching, folding, flexing, abrasive contact or laundering.

Coating 28 adds a relatively low surface energy layer to an ePTFE membrane so that the relative contact angle of most challenge liquids, oils and contaminating agents is greater than 90° which inhibits fouling of composite membrane 12. An aqueous dispersion of the coating material contains relatively low molecular weight fluorinated polymer particles or "solids". The dispersion also includes water and surfactant, such as sodium dodecyl benzene sulfonate to suspend the particles in the water and minimize the chance of the solids to form agglomerates. The polymer particles are separated from the water and the surfactant prior to use. In alternate embodiments, there are solvents, co-solvents or other surfactants in the dispersion.

Substantially improved oleophobic properties of the base membrane 16 are realized if the surfaces defining pores 26 in the membrane and the major side surfaces of the membrane are treated or coated with any of the fluorinated polymers described above. In the exemplary embodiment, coating 28 is introduced into even the smallest pores 26 of base membrane 16 to apply a relatively thin and even coating 28 to the surfaces of nodes 22 and fibrils 24 that define pores 26 without having an impact on the size of pores 26.

A fluid having a surface tension less than about 15 dynes/cm, for example, a densified gas, can be used to entrain or dissolve the above described coating 28 and introduce coating 28 into pores 26 of porous base membrane 16. The densified gas can be in its liquid, supercritical, or near critical state, for example, supercritical carbon dioxide. In alternative embodiments, the densified gas can include a co-solvent. The solubility of coating material 28 in supercritical carbon dioxide is determined by experimentation. The co-polymer of coating 28 is typically dissolved in liquid or supercritical $CO_2$ in concentrations ranging between about 1 and about 15 percent by weight at temperatures typically between about 0° C. and 300° C. and pressures between about 30 bar and about 850 bar. The resulting solution is capable of wetting membrane 16 and entering pores 26 in membrane 16 with the dissolved coating material 28. The solution with dissolved coating material 28 has a surface tension, viscosity and relative contact angle that permit the dissolved coating material 28 to be easily carried into pores 26 of base membrane 16. It should be noted that liquid molecules are attracted to one another at their surfaces, and liquids with relatively high levels of intermolecular attraction possess high surface tension. The concept of "wetting" is a function of the surface energy of a liquid ($Y_{SL}$), surface energy of a solid ($Y_{SA}$) and the surface tension of a liquid ($Y_{LA}$), often described by the Young-Dupre equation below.

$$Y_{SL} - Y_{SA} = Y_{LA} * \cos(\theta) \quad (1)$$

Contact angle θ is a measure of the angle between the surface of a liquid drop and the surface of a solid taken at the tangent edge of where the liquid drop contacts the solid such that when the contact angle θ is 0°, a liquid will spread to a thin film over the solid surface. By comparison, a solid and liquid combination with a contact angle θ of 180° causes the liquid to form a spherical drop on the solid surface. When a contact angle θ between 0° and 90° exists, a liquid will "wet" the solid it is contacting and the liquid will be drawn into pores, if any, existing in the surface of a solid. When the contact angle θ is more than 90°, a liquid will not wet the solid and there will be a force needed to drive the liquid into any existing pores 26 present in base membrane 16.

In the exemplary embodiment, the solvent used for coating material 28 is carbon dioxide in a supercritical phase. The surface tension of the supercritical carbon dioxide ($SCCO_2$) solution is less than 0.1 dyne/cm so it can enter very small areas of base membrane 16 to coat. $SCCO_2$ and mixtures of $SCCO_2$ and coating materials also have a viscosity of less than about 0.5 centipoise. The viscosity and surface tension of the resultant solution are low compared to traditional solvents so resistance to flow is reduced, thus, lending itself to entering even the smallest pores 26 of base membrane 16. Thus, it is possible to enter and coat porous base membrane 16 with a relatively small pore size. Most solvents have a viscosity greater than 0.5 cps and a surface tension greater than about 15 dynes/cm that make it difficult to enter small pores 26 in base membrane 16 formed from ePTFE and, therefore, it is difficult to coat all the surfaces of base membrane 16 with such liquids.

Attractive properties are provided by $SCCO_2$ because it behaves like a gas and a liquid at the same time. The density of $SCCO_2$ is variable and in one embodiment ranges between about 0.4 grams/cc and about 0.95 grams/cc in its supercritical phase, depending on the temperature and/or pressure, so it functions like a liquid solvent. When it behaves like a liquid, it can dissolve coating material 28 forming a true solution and can be pumped efficiently. The $SCCO_2$ solution also behaves like a gas in that it has very low viscosity and surface tension, so it can enter very small spaces, such as relatively small pores 46 in base membrane 22 or spaces or voids in a node 22, fibril 24, or molecule forming base membrane 16.

Coating 28 is disposed on and around substantially all the surfaces of nodes 42 and fibrils 24 that define interconnecting pores 26 extending through untreated base membrane 16. In one exemplary embodiment, coating material 28 is deposited on the surfaces of nodes 22 and fibrils 24 by precipitation of coating material 28 from dense $CO_2$. In such a precipitation, swollen amorphous particles of coating material 28 are generated and are attracted to base membrane 16. Precipitation can be affected by expansion (decrease in pressure) of the dense $CO_2$. As the fluid expands the fluid flows in 3-dimensions, and fluid motion moves the coating particles into contact with nodes 22 and fibrils 24 surrounding pores 26. It is not necessary that coating 28 completely encapsulate the entire surface of a node 22 or fibril 24 to sufficiently modify the properties of base membrane 16. The relatively thin and uniformly even thickness C of coating 28 results from depositing numerous coating material particles on the majority of the surface area of base membrane 16, including surfaces of nodes 22 and fibrils 24. This deposition by precipitation occurs when the conditions, for example, pressure and/or temperature, of the dense $CO_2$ are changed to a level near to, or below the solubility limit of coating material 28. Such a process is described in U.S. Pat. No. 6,270,844 and U.S. patent application Ser. No. 10/255,043 which are assigned to at least one of the assignees of the present application and incorporated herein by reference.

The polymer coatings in the described method form very small 'particle-like' precipitates in the $CO_2$ fluid. These particles are very small as compared to conventional dispersed particles As the polymer particles precipitate from the low surface tension fluid the polymer stays highly swollen and the ePTFE material of base membrane remains completely wetted with the fluid and the $CO_2$-plasticsized polymer. As such, the fully precipitated polymer forms a conformal coating 28 around the 3-dimensional structure of base membrane 16 by coalescence. Process parameters are selected to control the thickness of coating 28 in the range of about 1.0 nanometer to about 500 nanometers and preferably in the range of about 1.0 nanometer to about 100 nanometers. In one embodiment, the ratio of the precipitated and deposited thickness C of coating 28 to a thickness F of fibril 22 is in the range of about 0.2% to about 40% and in another embodiment, about 0.2% to about 20%. The ratio of the precipitated and deposited thickness C of coating 28 to the effective average size D of the pores 26, in one embodiment, is in the range of about 0.2% to about 20% and in another embodiment, about 0.2% to about 10%.

The deposited coating material 28 adheres to surfaces of nodes 22 and fibrils 24 that define the pores 46 in base membrane 16. The deposited treatment material may be further processed if needed, such as by heating or by chemical conversion such as acid catalyzed de-protection, or acid, base, or thermally induced hydrolysis or saponification, or other suitable process. Coating material 28 provides a relatively thin and uniformly even property modifier to base membrane 16 that does not completely block or "blind" pores 26. In one embodiment, the composite membrane 12 has an air-permeability of at least about 0.10 CFM per square foot of membrane and in another embodiment, at least about 0.20 CFM per square foot of membrane measured by ASTM D737 testing.

Coating 28 provides increased strength to resist compression in the Z direction of the composite membrane 12, add tensile strength in the machine MD and transverse XD directions, has long lasting, or "durable", oleophobic properties.

The oleophobic polymer particles of coating material 28 are deposited onto the surfaces of the nodes 22 and fibrils 24 which define the pores 26 of base membrane 16 to form the coating 28 to reduce the surface energy of the composite membrane 12. Coating 28 of composite membrane 12 also serves to increase the contact angle for a challenge liquid relative to composite membrane 12. Thus, relatively few challenge liquids are capable of wetting composite membrane 12 and enter pores 26.

The size of the precipitated particle is believed to be in the range of about 1.0 nanometer to about 10.0 nanometers in diameter and preferably in the 1.0 nanometer to 5.0 nanometers range. It is believed that the particle size which is precipitated depends on the rate of depressurization. Thus, the ratio of the deposited coating 28 thickness T2 to the fibril 22 size T1 is in the range of 0.2% to 20% and in another exemplary embodiment, the range is 0.2% to 12%. The ratio of the deposited coating thickness T2 to the effective average size S of the pores 26 is in the range of 0.2% to 10% and in another exemplary embodiment, the range is 0.2% to 5%.

The fluorinated polymer particles of coating 28 engage and adhere to surfaces of nodes 22 and fibrils 24 that define pores 26 in base membrane 16 after the particles precipitate out of the solvent. The deposited fluorinated polymer particles may be heated on base membrane 16 to flow and cover the surfaces of nodes 22 and fibrils 24 and thereby render the composite membrane 12 even more resistant to contamination from absorbing oils and contaminating agents. Oleophobic coating 28, thus, provides a relatively thin and maximized protective coating on base membrane 16 that does not completely block or "blind" pores 26 in composite membrane 12 that could adversely affect moisture vapor transmission or air permeability through the composite membrane.

Composite membrane 12 has a relatively high moisture vapor transmission rate (MVTR) and air permeability while its oleophobic properties are improved by coating 28. Composite membrane 12 has an oil hold out of at least a number 6 and preferably is a number 8 as determined in accordance with AATCC 118. In some cases, the oleophobicity can be further improved by heating the deposited material that forms coating 28. Composite membrane 12, in one embodiment, has a moisture vapor transmission rate (MVTR) of at least about 50,000 $g/m^2$/day, and in another embodiment, at least about 70,000 $g/m^2$/day measured in accordance with JIS-1099B2. Composite membrane 12 is air permeable to a sufficient degree that a user of apparel made from the composite membrane can be relatively comfortable in most conditions and even during periods of extreme physical activity. Composite membrane 12, in one embodiment, has an air-permeability of at least about 0.20 CFM per square foot of membrane and in another embodiment at least about 0.30 CFM per square foot of membrane measured in accordance with ASTM D737.

Figure 5:
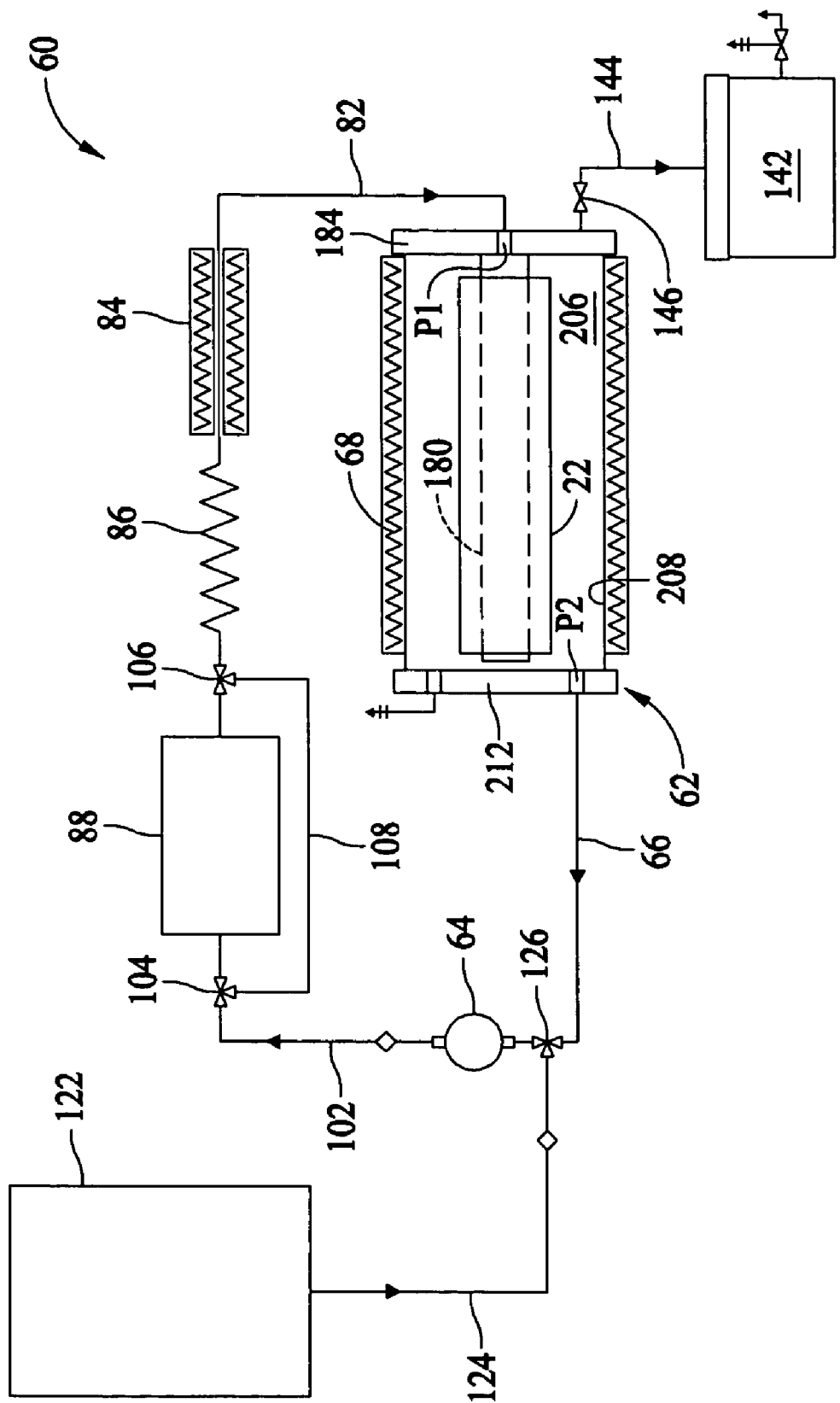
FIG. 5 is a schematic view of the process and equipment used to treat the membrane shown in FIG. 1.
Figure 6:
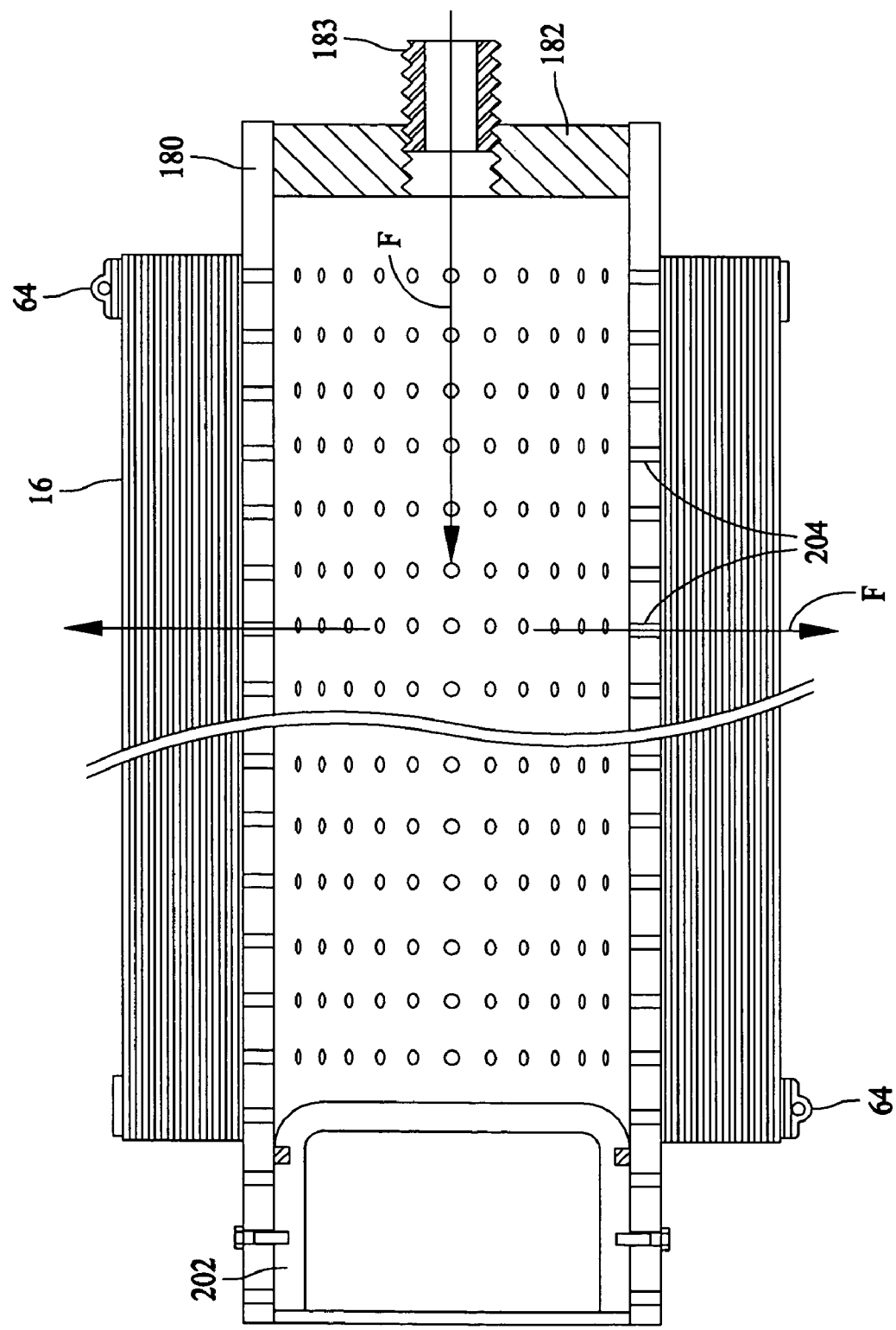
FIG. 6 is an enlarged sectional view of a portion of the equipment shown in FIG. 5.

FIG. 5 is a schematic illustration of a supercritical fluid coating apparatus 60 used to apply coating 28 to base membrane 16, and FIG. 6 is an enlarged sectional view of a portion of coating apparatus 60. Referring to FIGS. 5 and 6, in an exemplary embodiment, coating apparatus 60 includes a treatment vessel 62 for applying coating 28 to base membrane 16. Treatment vessel 62 is capable of withstanding pressure up to about 12,320 psi (about 850 bar) and temperature in the range of about 0° C. to about 300° C. (32° F. to 572° F.). Treatment vessel 62 is sized appropriately such that the desired dimensions of base membrane 16 can fit into the treatment vessel housing. Treatment vessel 62 is fluidly connected to a supply and circulation pump 64 by line 66. Treatment vessel 62 has a heater 68 to maintain the walls of treatment vessel 62 at a predetermined temperature. Treatment vessel 62 is located in a fluid circulation loop connected by line 82 to a coating introduction vessel 88. Coating introduction vessel 88 is connected to pump 64 through line 102 and valve 104. Any or all of lines 82, 102 and vessels 62, 88 can be heated or cooled to maintain predetermined process conditions.

Pump 64 is also connected to a solvent storage container 122 through line 124 and valve 126. Storage container 122 houses solvent, for example, carbon dioxide, under pressure and is maintained at a temperature to assure delivery of solvent in a liquid phase to pump 64. In another embodiment, pump 64 is a compressor. Treatment vessel 62 is also connected to separation and recovery station 142 through line 144 and valve 146. Separation and recovery station 142 is vented to atmosphere or may be optionally connected to storage container 122 for recovering $CO_2$.

Untreated base membrane 16 is processed by first rolling a predetermined amount of base membrane 16 onto a core 180. The ends of the roll of base membrane 16 are secured with known securing mechanisms (not shown) such as clamps to hold base membrane 16. The securing mechanisms (not shown) are sufficiently tightened to prevent axial fluid flow exiting the ends of rolled base membrane 16. Core 180 is made from any suitable material, for example, perforated stainless steel, and includes a multiplicity of radially extending openings 204.

Core 180 and base membrane 16 are supported in treatment vessel 62 so that membrane 16 does not contact the interior of treatment vessel 62 so fluid can flow around the entire roll of membrane and wet the entire surface area of base membrane 22. While any suitable connection, support and cap structure can be used, core 180 is sealed at one axial end to a core cap 182 that is welded to core 180. Core cap 182 is attached to a removably securable end cap 184 of treatment vessel 62 by a threaded connection 183. Core 180 is shown extending horizontally in FIG. 5. In alternate embodiments (not shown), core 180 and treatment vessel 62 are oriented in a vertical direction or any other orientation. The interior of core 180 is in fluid communication with line 82 through a port P1 in end cap 184.

In operation, a pressure differential in the range of about 1 psi to about 100 psi exists between the inside of core 180 and the outside of the roll of membrane 22. The pressure differential can vary and is a function of fluid flow velocity, roll size, pore size and pore density. Fluid flows from open space 206 in treatment vessel 62 through a port P2 in a second removably securable end cap 212 of treatment vessel 62 into treatment vessel outlet line 66.

To coat base membrane 16, coating material 28 is placed in treatment introduction vessel 88. The amount of coating material 28 depends on the solution concentration desired in the system and the target predetermined add-on weight deposited on membrane 16. Core 180 and roll of membrane 16 are placed in treatment vessel 62 and connected to end cap 184 for fluid flow through the core and membrane. End caps 184 and 212 are secured to seal treatment vessel 62. Membrane 22 is made from a material that does not dissolve in the selected fluid solvent, for example, carbon dioxide.

Valve 146 is closed and valve 126 is positioned to allow fluid flow to the system. Solvent, for example, carbon dioxide, flows from storage container 122 into treatment vessel 62 and the rest of coating system 60 at the storage pressure. Valve 104 is opened. Pump 64 then fills lines 102, 82, 66 and vessel 62 while increasing system pressure. Valve 126 is positioned to block flow from container 122 and permit circulating flow between pump 64 and treatment vessel 62. Pump 64 raises the pressure in the system to a predetermined pressure. Pump 64 continues to cycle solvent, through line 102, through treatment introduction vessel 88, and line 82 and through treatment vessel 62.

The coating material 28 is exposed to the solvent when the solvent flows through treatment introduction vessel 88. Coating material 28 in treatment introduction vessel 88 is entrained or is dissolved in the solvent flowing through it at the predetermined conditions. Any suitable fluid capable of entraining coating material 28 under predetermined conditions can be used and the use of a co-solvent can be employed. In the exemplary embodiment, supercritical carbon dioxide is used. Flow through vessel 88 continues until the desired concentration of coating material 28 solute in the solution is attained. This flow is maintained until a predetermined amount of coating material 28 in treatment introduction vessel 88 is dissolved to obtain a predetermined amount of treatment material entrained in the solvent.

System pressure is controlled to reach a predetermined pressure. The temperature and pressure of the circulating solution is controlled as determined by the solubility of coating material 28 in the solvent so the coating material dissolves for a predetermined solute concentration. Pressure and volume of solvent can be increased in a known manner by a make-up supply and pump (not shown). Coating material 28 is exposed to the fluid when the fluid is in a phase that can solubilize the treatment material. One such fluid solvent is carbon dioxide in a supercritical phase. For example, when supercritical carbon dioxide ($SCCO_2$) is at 220 bar or higher pressure and a temperature of 35° C., for the concentration of up to 4%, coating material 28 dissolves in the solvent. Each concentration line can be graphed to represent a "cloud point" where the solute visually becomes insoluble and begins to precipitate out of the supercritical fluid during a phase monitor study as a function of pressure. Coating material solid particles in the treatment introduction vessel 88 dissolve in the solvent flowing through it at supercritical conditions.

Once the predetermined concentration of coating material 28 in the solution is reached and the system pressure and temperature stabilize, the solution is circulated through the system for a predetermined time. By way of example, the solution circulates through pump 64, treatment introduction vessel 88, temperature control device 84, line 82, through end cap 184, into the interior of core 180, through pores 26 in the roll of membrane 16, into space 206 in treatment vessel 62, through cap 212, through line 66 and then back to pump 64. This assures that every pore 26 in the roll of base membrane 16 is exposed to the solution.

When the solution circulates for sufficient time at the predetermined system conditions, pump 64 is stopped. The pressure and/or temperature of the solution is then permitted to change to a condition in which the treatment material solute is no longer soluble. For example, the pressure is reduced to 150 bar and the temperature is maintained at 35° C. Coating material 28 then precipitates out of the solution and is deposited onto membrane 16. The pressure is then further reduced to 1 atmosphere so treatment vessel 62 can be opened. The coating material 28 is deposited onto substantially all the surfaces of nodes 22 and fibrils 24 defining pores 26 in porous base membrane 16.

In one exemplary embodiment, heat is applied to composite membrane 12 after precipitated coating 28 has been applied. The heat is applied at about 140° C. heat for about thirty (30) seconds to the composite membrane 12. The applied heat permits coating 28 to further flow around the surfaces of nodes 22 and fibrils 24 to become even more uniformly distributed and thinner to render composite membrane 12 oil and contaminating agent resistant to a more significant degree than a composite membrane that has not been heated. Also, the applied heat can permit the coating to have a degree of mobility that permits the coating molecule to rotate so that the molecular parts with the lowest surface energy faces the air. This makes the coating more effective in making the membrane more oleophobic.

While the invention has been described in terms of various specific embodiments, those skilled in the art will recognize that the invention can be practiced with modification within the spirit and scope of the claims.

What is claimed is:

1. An air permeable composite article comprising:
    a polymeric porous base membrane comprising a plurality of nodes and fibrils defining a plurality of interconnecting pores extending therethrough, each said node and fibril comprising a surface; and
    a precipitated coating material deposited on said surfaces of said plurality of nodes and fibrils, said coating material comprising a copolymer formed from a fluorinated acrylate, butyl acrylate, and a monoisocyanate crosslinker having the following structure:

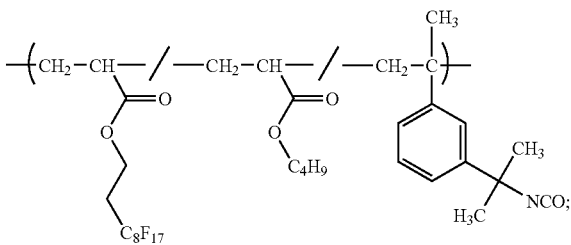

said precipitated coating material providing oil and contaminating agent resistance of at least a number six measured in accordance with AATCC 118 test method.

2. An air permeable composite article in accordance with claim 1 wherein said porous base membrane comprises at least one of polyolefin, polyamide, polyester, polysulfone, polyether, acrylic, methacrylic, polystyrene, polyurethane, polypropylene, polyethylene, cellulosic polymer, and polytetrafluoroethylene (PTFE).

3. An air permeable composite article in accordance with claim 1 wherein said porous base membrane comprises at least one of expanded PTFE, woven PTFE, and non-woven PTFE.

4. An air permeable composite article in accordance with claim 1 wherein said coating material is precipitated from a densified gas by changing conditions of the densified gas to below a solubility limit of said coating material in the densified gas.

5. An air permeable composite article in accordance with claim 1 wherein said precipitated coating material forms a coating layer on said surfaces of said nodes and fibrils, said coating layer having a thickness of about 1.0 nanometer to about 500 nanometers.

6. An air permeable composite article in accordance with claim 1 wherein said precipitated coating material forms a coating layer on said surfaces of said nodes and fibrils, said coating layer having a thickness of about 1.0 nanometer to about 100 nanometers.

7. An air permeable composite article comprising:
    a polymeric porous base membrane comprising a plurality of nodes and fibrils defining a plurality of interconnecting pores extending therethrough, each said node and fibril comprising a surface; and
    a coating material deposited on said surfaces of said plurality of nodes and fibrils, said coating material comprising a copolymer formed from a fluorinated acrylate, butyl acrylate, and a monoisocyanate crosslinker having the following structure:

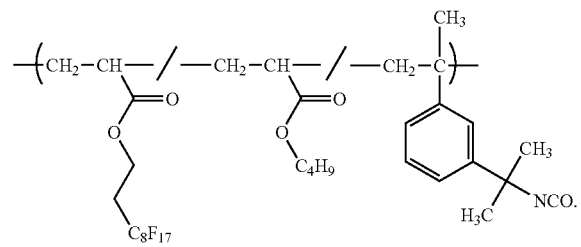

8. An air permeable composite article in accordance with claim 7 wherein said porous base membrane comprises at least one of polyolefin, polyamide, polyester, polysulfone, polyether, acrylic, methacrylic, polystyrene, polyurethane, polypropylene, polyethylene, cellulosic polymer, and polytetrafluoroethylene (PTFE).

9. An air permeable composite article in accordance with claim 7 wherein said porous base membrane comprises at least one of expanded PTFE, woven PTFE, and non-woven PTFE.

10. An air permeable composite article in accordance with claim 7 wherein said coating material is deposited from a densified gas by changing conditions of the densified gas to below a solubility limit of said coating material in the densified gas.

11. An air permeable composite article in accordance with claim 7 wherein said deposited coating material forms a coating layer on said surfaces of said nodes and fibrils, said coating layer having a thickness of about 1.0 nanometer to about 500 nanometers.

12. An air permeable composite article in accordance with claim 7 wherein the precipitated coating material provides oil and contaminating agent resistance of at least a number six measured in accordance with AATCC 118 test method, and the composite article has an air permeability of at least about 0.20 CFM per square foot of the porous base membrane as measured in accordance with ASTM D737.

13. An air permeable sheet material comprising:
    a polymeric porous base membrane comprising a plurality of nodes and fibrils defining a plurality of interconnecting pores extending therethrough, each said node and fibril comprising a surface; and
    a precipitated coating material deposited on substantially all said surfaces of said plurality of nodes and fibrils, said coating material comprising a copolymer formed from a fluorinated acrylate, butyl acrylate, and a monoisocyanate crosslinker having the following structure:

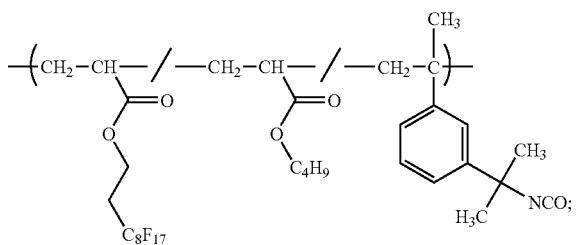

said precipitated coating material applied from a low surface tension fluid capable of entering said pores in said porous base membrane, said coating material precipitated on said surfaces of said plurality of nodes and fibrils upon rendering said coating material insoluble in said low surface tension fluid;

said precipitated coating material providing oil and contaminating agent resistance of at least a number six measured in accordance with AATCC 118 test method.

14. An air permeable sheet material in accordance with claim 13 wherein said porous base membrane comprises at least one of polyolefin, polyamide, polyester, polysulfone, polyether, acrylic, methacrylic, polystyrene, polyurethane, polypropylene, polyethylene, cellulosic polymer, and polytetrafluoroethylene (PTFE).

15. An air permeable sheet material in accordance with claim 13 wherein said porous base membrane comprises at least one of expanded PTFE, woven PTFE, and non-woven PTFE.

16. An air permeable sheet material in accordance with claim 13 wherein said low surface tension fluid comprises a densified gas.

17. An air permeable sheet material in accordance with claim 13 wherein said precipitated coating material forms a coating layer on said surfaces of said nodes and fibrils, said coating layer having a thickness of about 1.0 nanometer to about 500 nanometers.

18. An air permeable sheet material in accordance with claim 13 wherein said precipitated coating material forms a coating layer on said surfaces of said nodes and fibrils, said coating layer having a thickness of about 1.0 nanometer to about 100 nanometers.

* * * * *